US012315042B2

(12) United States Patent
Zhou et al.

(10) Patent No.: US 12,315,042 B2
(45) Date of Patent: May 27, 2025

(54) IMAGE GENERATION METHOD, APPARATUS, AND DEVICE, AND STORAGE MEDIUM

(71) Applicant: Beijing Bytedance Network Technology Co., Ltd., Beijing (CN)

(72) Inventors: Caijin Zhou, Beijing (CN); Xinghong Hu, Beijing (CN); Youwen Zhuang, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 166 days.

(21) Appl. No.: 18/023,893

(22) PCT Filed: Aug. 11, 2021

(86) PCT No.: PCT/CN2021/112039

§ 371 (c)(1),
(2) Date: Feb. 28, 2023

(87) PCT Pub. No.: WO2022/048414

PCT Pub. Date: Mar. 10, 2022

(65) Prior Publication Data

US 2023/0334729 A1 Oct. 19, 2023

(30) Foreign Application Priority Data

Sep. 2, 2020 (CN) ........................ 202010909071.9

(51) Int. Cl.
*G06T 11/00* (2006.01)
*G06T 5/70* (2024.01)
(Continued)

(52) U.S. Cl.
CPC .............. *G06T 11/001* (2013.01); *G06T 5/70* (2024.01); *G06T 7/11* (2017.01); *G06T 7/90* (2017.01);
(Continued)

(58) Field of Classification Search
CPC . G06T 11/001; G06T 7/11; G06T 7/90; G06T 5/70; G06T 11/60; G06T 2207/10024; G06T 2207/30196
See application file for complete search history.

(56) References Cited

U.S. PATENT DOCUMENTS 5,828,819 A * 10/1998 Do ........................ G06T 11/001 345/604
2011/0102457 A1* 5/2011 Bhatt .................. G06F 3/04812 715/810
(Continued)

FOREIGN PATENT DOCUMENTS

CN 101241593 A 8/2008
CN 103164158 A 6/2013
(Continued)

OTHER PUBLICATIONS

Gooch, Bruce, Greg Coombe, and Peter Shirley. “Artistic vision: painterly rendering using computer vision techniques.” Proceedings of the 2nd international symposium on Non-photorealistic animation and rendering. 2002. (Year: 2002).*
(Continued)

*Primary Examiner* — Yu Chen
(74) *Attorney, Agent, or Firm* — Astute IP Law Group

(57) ABSTRACT

An image generation method, apparatus, and device, and a storage medium are provided. The method comprises: setting at least two brush layers for a target image, wherein each of the at least two brush layers is set with a preset brush density; determining, for each brush layer, attributes of
(Continued)

Set at least two brush layers for a target image, where each of the at least two brush layers has a preset brush density corresponding to the brush layer — S101

For each brush layer, sample the brush layer based on the preset brush density corresponding to the brush layer, and determine the brush position information of the brush objects on the brush layer — S102

Establish a brush queue for each brush layer, and store the brush objects on the corresponding brush layer in the brush queue, where the attributes of the brush object includes the brush position information and the brush size, and the brush size is determined based on the preset brush size corresponding to the brush layer where the brush object is located — S103

Generate a target styled image corresponding to the target image based on the attributes of the brush objects in the brush queue corresponding to each brush layer — S104 brush objects on the brush layer based on the preset brush density of the brush layer, wherein the attributes include brush position information and brush size; establishing a brush queue for each brush layer, and for each of the brush objects, storing the brush object in the brush queue of the brush layer corresponding to the brush object; and generating a target styled image corresponding to the target image based on the attributes of the brush objects in the brush queue of each brush layer.

19 Claims, 5 Drawing Sheets

(51) Int. Cl.

| | |
|---|---|
| ***G06T 7/11*** | (2017.01) |
| ***G06T 7/90*** | (2017.01) |
| ***G06T 11/60*** | (2006.01) |

(52) U.S. Cl.

CPC .... *G06T 11/60* (2013.01); *G06T 2207/10024* (2013.01); *G06T 2207/30196* (2013.01)

(56) References Cited

U.S. PATENT DOCUMENTS

| | | | | |
|---|---|---|---|---|
| 2015/0310305 | A1* | 10/2015 | Fang | G06T 11/001 345/441 |
| 2016/0328865 | A1* | 11/2016 | Neulander | G06T 11/20 |
| 2016/0328866 | A1* | 11/2016 | Neulander | G06T 11/20 |
| 2017/0249756 | A1* | 8/2017 | Deguy | G06T 11/001 |
| 2019/0304200 | A1 | 10/2019 | Jeon | |

FOREIGN PATENT DOCUMENTS

| | | | |
|---|---|---|---|
| CN | 103903293 | A | 7/2014 |
| CN | 104820999 | A | 8/2015 |
| CN | 106683151 | A | 5/2017 |
| CN | 112070854 | A | 12/2020 |

OTHER PUBLICATIONS

International Search Report and Written Opinion for International Patent Application No. PCT/CN2021/112039, mailed Nov. 11, 2021 (14 pages).

* cited by examiner

IMAGE GENERATION METHOD, APPARATUS, AND DEVICE, AND STORAGE MEDIUM

This application is a 35 U.S.C. § 371 National Phase of International Patent Application No. PCT/CN2021/112039 titled "IMAGE GENERATION METHOD, APPARATUS, AND DEVICE, AND STORAGE MEDIUM", filed on Aug. 11, 2021, which claims priority to Chinese Patent Application No. 202010909071.9, titled "IMAGE GENERATION METHOD, APPARATUS, AND DEVICE, AND STORAGE MEDIUM", filed on Sep. 2, 2020, with the China National Intellectual Property Administration (CNIPA), both of which isare incorporated herein by reference in their entireties its entirety.

FIELD

The present disclosure relates to the field of data processing, and in particular, to an image generation method, apparatus, device, and storage medium.

BACKGROUND

With the development of computer technology, a variety of functional software can be realized based on computer technology, and users' demands for various functional software are increasing day by day. The computer technology may be used to intelligently generate a styled image corresponding to a target image, such as oil painting style, sketch style, cartoon style or styled images, and then display the styled image, which may enrich the functions of image processing software and satisfy users with more image processing needs.

For the intelligent generation of the styled image corresponding to the target image, it is necessary to determine the size, position and other attributes of the brush objects involved in drawing the styled image. At present, the attributes of the brush objects are determined by establishing a mathematical model for all the brush objects involved in drawing the styled image. Specifically, the attributes of each brush object serve as variables of the mathematical model, and the problem of determining the attributes of the brush objects is transformed into a mathematical problem of determining the optimal solution to the mathematical model.

Usually numerous brush objects are involved in drawing a styled image and determining the optimal solution to the mathematical model has high performance consumption. Therefore, the above method has obviously a low efficiency in determining attributes of the brush objects involved in drawing a styled image, and in turn the generation of the styled image based on the attributes of the brush objects is inefficient and time-consuming.

SUMMARY

In order to solve the above technical problems or at least partially solve the above technical problems, the present disclosure provides an image generation method, apparatus, device and storage medium, which can improve the efficiency of image generation and reduce time consumption.

An image generation method is provided in the present disclosure. The method includes:

setting at least two brush layers for a target image, where each of the at least two brush layers is set with a preset brush density;

the face area, where the attributes include brush position information and brush size;

establishing a brush queue for each brush layer, and for each of the brush objects, storing the brush object in the brush queue of the brush layer corresponding to the brush object; and generating a target styled image corresponding to the target image based on the attributes of the brush objects in the brush queue of each brush layer.

In an embodiment, the determining, for each brush layer, attributes of brush objects on the brush layer based on the preset brush density of the brush layer includes:

for each brush layer, sampling the brush layer based on the preset brush density of the brush layer, and determining the brush position information of the brush objects on the brush layer.

In an embodiment, the determining, for each brush layer, attributes of brush objects on the brush layer based on the preset brush density of the brush layer includes:

determining a preset brush size corresponding to the preset brush density, based on the preset brush density of each brush layer and a correspondence between the preset brush density and the brush size; and determining the brush size of the brush object based on the preset brush size.

In an embodiment, the attributes further include a drawing direction, and the drawing direction is randomly generated.

In an embodiment, the attributes further include a brush color, and the brush color is determined based on a color value of a pixel on the target image that has a correspondence with the brush position information of the brush object.

In an embodiment, the generating the target styled image corresponding to the target image based on the attributes of the brush objects in the brush queue of each brush layer includes:

drawing, based on the attributes of the brush objects in the brush queue of each brush layer, the brush layer corresponding to the brush queue; and overlaying brush layers corresponding to at least two brush queues to generate the target styled image corresponding to the target image.

In an embodiment, the overlaying brush layers corresponding to at least two brush queues to generate the target styled image corresponding to the target image includes:

determining a pixel value of a pixel, which has a smallest brightness among pixels at a same position of the brush layers corresponding to the at least two brush queues as a pixel value image of the pixel at a corresponding position in the target styled image corresponding to the target image.

In an embodiment, the drawing, based on the attributes of the brush objects in the brush queue of each brush layer, the brush layer corresponding to the brush queue includes:

drawing, with a graphics operation unit, brush objects in respective brush queues in parallel based on the attributes of the brush objects in the brush queue of each brush layer; and drawing brush layers corresponding to respective brush queues based on the drawing of the brush objects in respective brush queues.

In an embodiment, before generating the target styled image corresponding to the target image based on the attributes of the brush objects in the brush queue of each brush layer, the method further includes:

detecting whether the target image includes a person image; and setting a skin brush layer for the target image based on a segmented skin area in the target image, in response to the target image including the person image;

correspondingly, the generating the target styled image corresponding to the target image based on the attributes of the brush objects in the brush queue of each brush layer includes:

generating the target styled image corresponding to the target image based on the attributes of the brush objects in the brush queue of each of the at least two brush layers and the skin brush layer.

In an embodiment, before generating the target styled image corresponding to the target image based on the attributes of the brush objects in the brush queue of each of the at least two brush layers and the skin brush layer, the method further includes:

establishing a brush queue for the skin brush layer, and storing the brush object in the brush queue of the skin brush layer corresponding to the brush object, where the brush size in the attributes of the brush object on the skin brush layer is determined based on a size of a largest skin area detected on the target image.

In an embodiment, the generating the target styled image corresponding to the target image based on the attributes of the brush objects in the brush queue of each of the at least two brush layers and the skin brush layer includes:

drawing, based on the attributes of the brush objects in the brush queues of the at least two brush layers, the brush layers corresponding to the brush queues;

overlaying the brush layers corresponding to the at least two brush queues to obtain a first initial overlay layer;

drawing the skin brush layer based on the attributes of the brush objects in the brush queue of the skin brush layer; and overlaying the first initial overlay layer and the skin brush layer to generate the target styled image corresponding to the target image.

In an embodiment, before generating the target styled image corresponding to the target image based on the attributes of the brush objects in the brush queue of each brush layer, the method further includes:

determining a flat area in the target image;

generating a bump texture map for the target image, based on the flat area in the target image;

correspondingly, the generating the target styled image corresponding to the target image based on the attributes of the brush objects in the brush queue of each brush layer includes:

generating the target styled image corresponding to the target image, based on the attributes of the brush objects in the brush queue of each brush layer and the bump texture map.

In an embodiment, the generating the target styled image corresponding to the target image, based on the attributes of the brush objects in the brush queue of each brush layer and the bump texture map includes:

drawing, based on the attributes of the brush objects in the brush queues of the at least two brush layers, the brush layers corresponding to the brush queues;

overlaying brush layers corresponding to at least two brush queues to obtain a second initial overlay layer; and overlaying the bump texture map with the second initial overlay layer to generate the target styled image corresponding to the target image.

In an embodiment, before overlaying the bump texture map and the second initial overlay layer to generate the target styled image corresponding to the target image, the method further includes:

calculating a direction field of the second initial overlay layer, and visualizing the direction field through line integral, to obtain an initial texture map corresponding to the second initial overlay layer;

correspondingly, the generating the bump texture map for the target image based on the flat area in the target image includes:

smoothing, in the initial texture map corresponding to the second initial overlay layer, a streamline texture of an area corresponding to the flat area, to obtain the bump texture map corresponding to the target image.

In an embodiment, the determining the flat area in the target image includes:

for each pixel in the target image, calculating a structure tensor matrix corresponding to the pixel, and perform eigenvalue decomposition on the structure tensor matrix to obtain two eigenvalues corresponding to the pixel;

for each pixel in the target image, determining a texture degree corresponding to the pixel based on the larger one of the two eigenvalues corresponding to the pixel; and determining the flat area in the target image based on the texture degrees corresponding to respective pixels in the target image.

In a second aspect, an image generation apparatus is provided in the present disclosure. The apparatus includes:

a first setting module, configured to set at least two brush layers for a target image, where each of the at least two brush layers is set with a preset brush density;

a first determination module, configured to determine, for each brush layer, attributes of brush objects on the brush layer based on the preset brush density of the brush layer, where the attributes include brush position information and brush size;

a first storage module, configured to establish a brush queue for each brush layer, and for each of the brush objects, storing the brush object in the brush queue of the brush layer corresponding to the brush object; and a first generation module, configured to generate a target styled image corresponding to the target image based on the attributes of the brush objects in the brush queue of each brush layer.

In a third aspect, a computer-readable storage medium is provided in the present disclosure. The computer-readable storage medium stores instructions which, when being executed on a terminal device, cause the terminal device to implement the above method.

In a fourth aspect, a device is provided in the present disclosure. The device includes a memory, a processor, and a computer program stored on the memory and executable on the processor. The processor, when executing the computer program, implements the above method.

Compared with the conventional technology, the technical solutions provided by the embodiments of the present disclosure have the following advantages.

An image generation method is provided in an embodiment of the present disclosure. Specifically, with the method, at least two brush layers are set for a target image, and each of the at least two brush layers is set with a preset brush density; then, attributes of brush objects on each brush layer are determined based on the preset brush density of each brush layer, where the attributes include brush position information and brush size; next, a brush queue is established for each brush layer, and for each of the brush objects, the brush object is stored in the brush queue of the brush layer corresponding to the brush object; and finally, a target styled image corresponding to the target image is generated based on the attributes of the brush objects in the brush queue of each brush layer. Further, in the present disclosure, the brush position information of the brush object is determined by sampling the brush layer based on the preset brush density; a preset brush size is determined for each brush player based on the preset brush density of the brush layer; and then the brush size of the brush object is determined based on the preset brush size. It can be seen that in the present disclosure, the brush position information and the brush size of the brush object are determined in a simple and efficient manner, which improves the efficiency of determining the attributes of the brush objects involved in drawing the target styled image, and further improves the efficiency in generating the target styled image based on the attributes of the brush objects.

Moreover, in the present disclosure, an image is generates by drawing at least two brush layers and then overlaying the brush layers, which can improve the quality of the generated target styled image. Therefore, the image generation method provided by the present disclosure can improve the quality of the target styled image in addition to improving the efficiency of generating the target styled image.

BRIEF DESCRIPTION OF THE DRAWINGS

The accompanying drawings, which are incorporated in and constitute a part of this specification, illustrate embodiments consistent with the present disclosure and together with the description serve to explain the principles of the present disclosure.

In order to more clearly illustrate technical solutions in embodiments of the present disclosure or in the conventional technology, the accompanying drawings to be used in the description of the embodiments or the conventional technology will be briefly introduced below. Obviously, other drawings may be obtained from these drawings by the skilled in the art without any creative effort.

FIG. 3 is an effect comparison diagram according to an embodiment of the present disclosure;

DETAILED DESCRIPTION OF EMBODIMENTS

Figure 1:
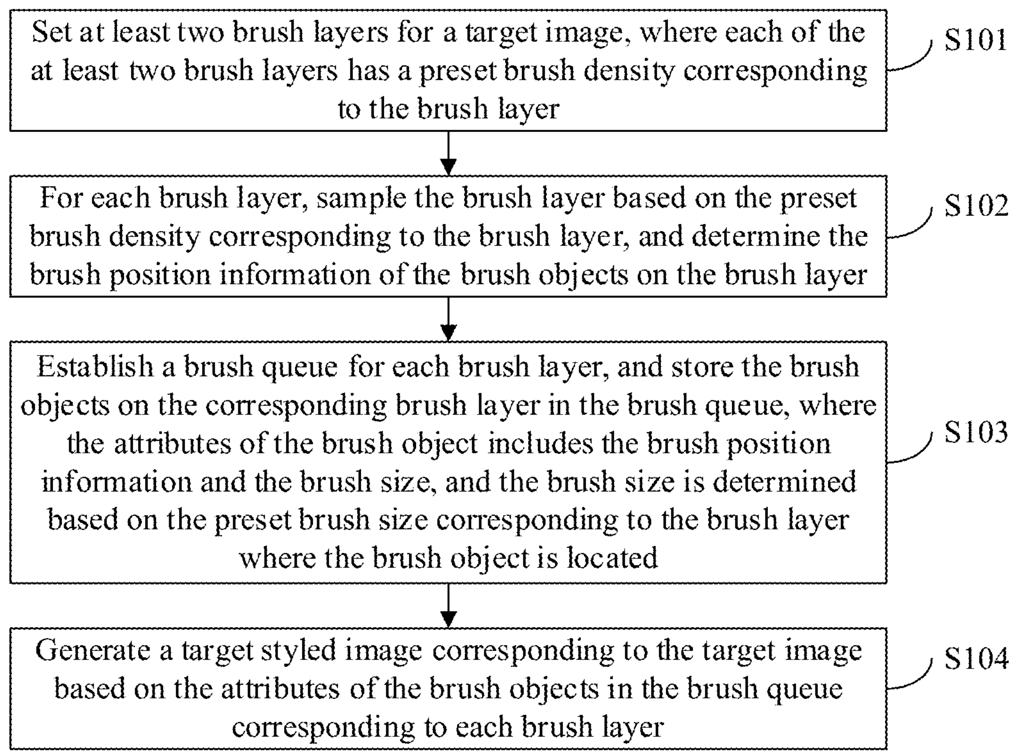
FIG. 1 is a flowchart of an image generation method according to an embodiment of the present disclosure.

In order to more clearly understand the above objects, features and advantages of the present disclosure, the solutions of the present disclosure will be further described below. It should be noted that the embodiments of the present disclosure and features in the embodiments may be combined with each other if there is no conflict.

Many specific details are set forth in the following description to facilitate a full understanding of the present disclosure, but there are other ways different from those described herein to implement the present disclosure. Obviously, the embodiments in the specification are only a part rather than all of embodiments of the present disclosure.

Drawing and displaying a styled image has become a function for scene-image processing. Based on this, software with the function of generating a target styled image from a target image is more and more popular in users. Therefore, how to efficiently generate a styled image corresponding to the target image and further improve the quality of the generated styled image is a problem currently faced by the technicians.

In view of this, an image generation method is provided in the present disclosure. In the method, at least two brush layers are set for a target image, and each of the at least two brush layers is set with a preset brush density; then, attributes of brush objects on each brush layer are determined based on the preset brush density of the brush layer, where the attributes include brush position information and brush size; next, a brush queue is established for each brush layer, and the brush objects are each stored in the brush queue of the brush layer corresponding to the brush object; and finally, a target styled image corresponding to the target image is generated based on the attributes of the brush objects in the brush queue of each brush layer.

Further, in the present disclosure, the brush position information of the brush object is determined by sampling the brush layer based on the preset brush density; a preset brush size is determined for each brush player based on the preset brush density of the brush layer; and then the brush size of the brush object is determined based on the preset brush size. It can be seen that in the present disclosure, the brush position information and the brush size of the brush object are determined in a simple and efficient manner, which improves the efficiency of determining the attributes of the brush objects involved in drawing the target styled image, and further improves the efficiency in generating the target styled image based on the attributes of the brush objects.

Moreover, in the present disclosure, a target styled image is generated by drawing at least two brush layers and then overlaying the brush layers, which can improve the quality of the generated target styled image.

In view of the above, the image generation method provided by the present disclosure can improve the quality of the target styled image in addition to improving the efficiency of generating the target styled image.

Based on this, an image generation method is provided in an embodiment of the present disclosure. FIG. 1 is a flowchart of an image generation method according to an embodiment of the present disclosure. Referring to FIG. 1, the method includes the following steps S101 to S104.

In S101, at least two brush layers are set for a target image. Each of the at least two brush layers has a preset brush density.

In an embodiment of the present disclosure, the target image may be various types of images. For example, the target image may be a person image, a landscape image, or the like.

In an embodiment, the target image may be determined by the user. Specifically, the user may select any image from an album in the terminal as the target image, or may trigger the photographing function and take a photographed image as the target image. The specific manner of determining the target image is not limited in the embodiment of the present disclosure.

In order to improve the quality of the generated target styled image, in an embodiment of the present disclosure, after the target image is determined, at least two brush layers may be set for the target image. Each brush layer is set with a corresponding preset brush size, and different brush layers correspond to different brush sizes. By using different brush sizes to draw different brush layers, the generated target styled image fulfills the actual drawing effect to the greatest extent, so as to improve the quality of the target styled image.

In an embodiment, a large-brush layer, a medium-brush layer and a small-brush layer may be set for the target image. Specifically, the preset brush size corresponding to the large-brush layer is the largest, the preset brush size corresponding to the medium-brush layer is the middle, and the preset brush size corresponding to the small-brush layer is the smallest. By drawing the large-brush layer, the medium-brush layer and the small-brush layer, the quality of the generated target styled image may be improved.

Moreover, before drawing any brush layer, it is necessary to first determine attributes of the brush objects on the brush layer. The attributes of the brush object may include brush position information, brush size, drawing direction, brush color, and the like.

In practice, different brush layers may be set with different preset brush densities or a same preset brush density. The preset brush density may determine an interval between brush objects in the corresponding brush layer.

In an embodiment, a brush layer having a larger preset brush size has a smaller preset brush density, and a brush layer having a smaller preset brush size has a larger preset brush density.

In S102, for each brush layer, the brush layer is sampled based on the preset brush density corresponding to the brush layer, and the brush position information of the brush objects on the brush layer is determined.

In an embodiment of the present disclosure, the brush position information is used to indicate the position where the corresponding brush object is to be drawn. The brush position information may be two-dimensional coordinates.

In some embodiment, the attributes of the brush objects on any brush layer may be determined based on the preset brush density of the brush layer. For example, the brush position information of the brush objects on any brush layer is determined based on the preset brush density of the brush layer.

Specifically, when determining the brush position information of a brush object, the brush layer where the brush object is located is firstly determined, and then the preset brush density corresponding to the brush layer is determined; the brush layer is sampled based on the preset brush density, and the brush position information of the brush object is determined based on positions of sampling points.

The brush position information of the brush objects on each brush layer is determined by sampling the brush layer in the embodiment of the present disclosure. Therefore, before sampling the brush layer, the preset brush density corresponding to the brush layer is first determined, so as to sample the brush layer based on the preset brush density, so as to determine the brush position information of the brush objects on each brush layer.

In an embodiment, the brush layer may be uniformly sampled based on the preset brush density, to determine the brush position information of the brush objects on the brush layer.

It is assumed that the resolution of the target image is W*H, the preset brush density corresponding to a brush layer is d, and the brush size corresponding to this brush layer is w*h. If the brush layer is uniformly sampled based on the preset brush density d, the spacing between the sampling points determined by uniform sampling is W/d in row and H/d in column, respectively. Based on this, the position information of each sampling point on the brush layer may be determined, and the position information of respective sampling points may be determined as the position information of the center points of the brush objects on the brush layer, i.e., the brush position information. Moreover, in an embodiment of the present disclosure, the quantity of brush objects to be drawn on the brush layer is equal to (W*H*d*d)/(w*h).

For each brush layer, the preset brush density of the brush layer may also be used to determine the brush size of the brush objects on the brush layer, which will be introduced later.

In S103, a brush queue is established for each brush layer, and the brush objects on corresponding brush layer are stored in the brush queue. The attributes of the brush object includes the brush position information and the brush size. The brush size is determined based on the brush layer where the brush object is located.

In some embodiment, after a brush queue is established for each brush layer, the brush object is stored in the brush queue of the brush layer corresponding to the brush object.

In an embodiment of the present disclosure, a corresponding preset brush size may be set for each brush layer, and the brush size of the brush object on the brush layer is determined based on the preset brush size corresponding to the brush layer.

In an embodiment, the preset brush size corresponding to each brush layer may be determined as the brush size of each brush object on the brush layer. The brush objects belonging to a same brush layer have the same brush size, that is, the brush layer is drawn by brushes with a same size.

In another embodiment, for each brush layer, the preset brush density of the brush layer may also be used to determine the brush size of the brush objects on the brush layer, which will be introduced later. Specifically, a correspondence between the brush density and the brush size is preset; the preset brush size corresponding to the preset brush density may be determined based on the preset brush density of a brush layer and the preset correspondence between the brush density and the brush size; then the preset brush size is determined as the brush size of the brush object on the brush layer.

In an embodiment of the present disclosure, the attributes of the brush object include not only the brush position information and the brush size, but also the drawing direction. The drawing direction is used to indicate the direction to draw the corresponding brush object.

In an embodiment, in order to determine and improve the efficiency associated with drawing direction, the drawing directions of brush objects may be randomly generated. In the embodiments of the present disclosure, the efficiency of generating the target styled image is improved by virtue of improving the efficiency of determining the drawing direction.

In addition, the attributes of the brush object in an embodiment of the present disclosure further include the brush color. The brush color indicates the color for drawing the brush object.

In an embodiment, the brush color of the brush object may be determined based on a color value of a pixel on the target image that has a correspondence with the brush position information of the brush object. Specifically, after the brush position information of the brush object is determined, the pixel at the position corresponding to the brush position information on the target image may be determined based on the brush position information, the color value corresponding to the pixel is obtained, and then the color value is determined as the brush color of the brush object.

In an embodiment of the present disclosure, after the attributes of the brush objects are determined, each brush object may be stored in the brush queue of the brush layer corresponding to the brush object. Since the brush queue follows the principle of first-in first-out, the order in which the brush objects are stored in the brush queue determines the order in which the brush objects in the brush queue are drawn.

In practice, the timing of establishing a brush queue for any brush layer may be any time before the brush objects are stored in the brush queue. For example, establishing the brush queue may be executed before the step S101 or S102, or may be executed after the step S101 or S102, or may be executed in parallel with the step S101 or S102. The specific execution sequence is not limited.

In S104, a target styled image corresponding to the target image is generated based on the attributes of the brush objects in the brush queue corresponding to each brush layer.

The target styled image may be an image with a specific artistic style, such as an oil painting styled image, a stick-drawing styled image, a cartoon style, a sketch style, and the like.

In an embodiment of the present disclosure, after determining the attributes of the brush objects on each brush layer and storing the brush objects in the corresponding brush queues, the brush layers corresponding to the brush queues may be drawn based on the attributes of the brush objects in the brush queues, respectively.

In an embodiment, the brush layers are independent from each other, and therefore, the brush layers may be drawn in parallel to improve the efficiency in drawing the brush layer and further improve the efficiency of image generation. Specifically, the graphics computing unit (GPU) may be used to draw the brush layers in parallel based on the brush objects in the respective brush queues.

In another embodiment, the brush objects are independent from each other, and therefore, the brush objects in the same brush queue may also be drawn in parallel, which further improves the efficiency in drawing the brush layers, thereby improving the efficiency of image generation. Specifically, the GPU may be used to draw the brush objects in respective brush queues in parallel, so as to improve the efficiency of image generation.

In practice, for several brush objects out of the same brush queue, the GPU may draw the several brush objects in parallel, and the drawing of each brush layer is completed based on the drawing of the brush objects.

In an embodiment of the present disclosure, after the drawing of each brush layer is completed, the brush layers are overlaid to finally generate the target styled image corresponding to the target image.

In an embodiment, the display effect is better at the position with a smaller brightness in the image. Therefore, in the embodiment of the present disclosure, a pixel value of a pixel, which has a smallest brightness among pixels at a same position of the brush layers, may be determined as the pixel value of the pixel at the same position in the target styled image. Pixel values of the pixels in the target styled image are determined in this way, thereby generating the target styled image corresponding to the target image.

In practice, pixels at a same position in the brush layers are compared with each other to determine the pixel with the smallest brightness value, then the pixel value of the pixel with the smallest brightness value is obtained and determined as a pixel value of a pixel at the same position in the target styled image. For example, for a pixel with coordinates (m, n), the brightness values of the pixels with the coordinates (m, n) in the brush layers are determined, then a pixel with the smallest brightness value among the pixels is determined, and the pixel value of the pixel with the smallest brightness value is determined as the pixel value of a pixel with the coordinates (m, n) in the target styled image.

In the image generation method according to the embodiment of the present disclosure, by sampling the brush layer based on the preset brush density, the brush position information of the brush object is determined, and then the brush size of the brush object is determined based on the preset brush size corresponding to the brush layer. Hence, the attributes of the brush objects are determined in a simple and efficient way, the efficiency in determining the attributes of the brush objects involved in drawing the target styled image is improved, and the efficiency in generating the target styled image based on the attributes of the brush objects is improved.

Moreover, in the embodiment of the present disclosure, a target styled image is finally generated by drawing at least two brush layers and then overlaying the brush layers, which can improve the quality of the generated target styled image.

It can be seen that with the image generation method according to the embodiment of the present disclosure, the quality of the generated target styled image is improved while improving the efficiency of image generation, thus realizing the efficient generation of the target styled image with higher quality, and improving user experience.

In practice, the target image may be an image of a person, for which skin-involved parts, such as the face, are generally critical. Therefore, an image generation method is further provided in an embodiment of the present disclosure, to further enhance the processing of skin-involved parts on the basis of the above embodiments.

Figure 2:
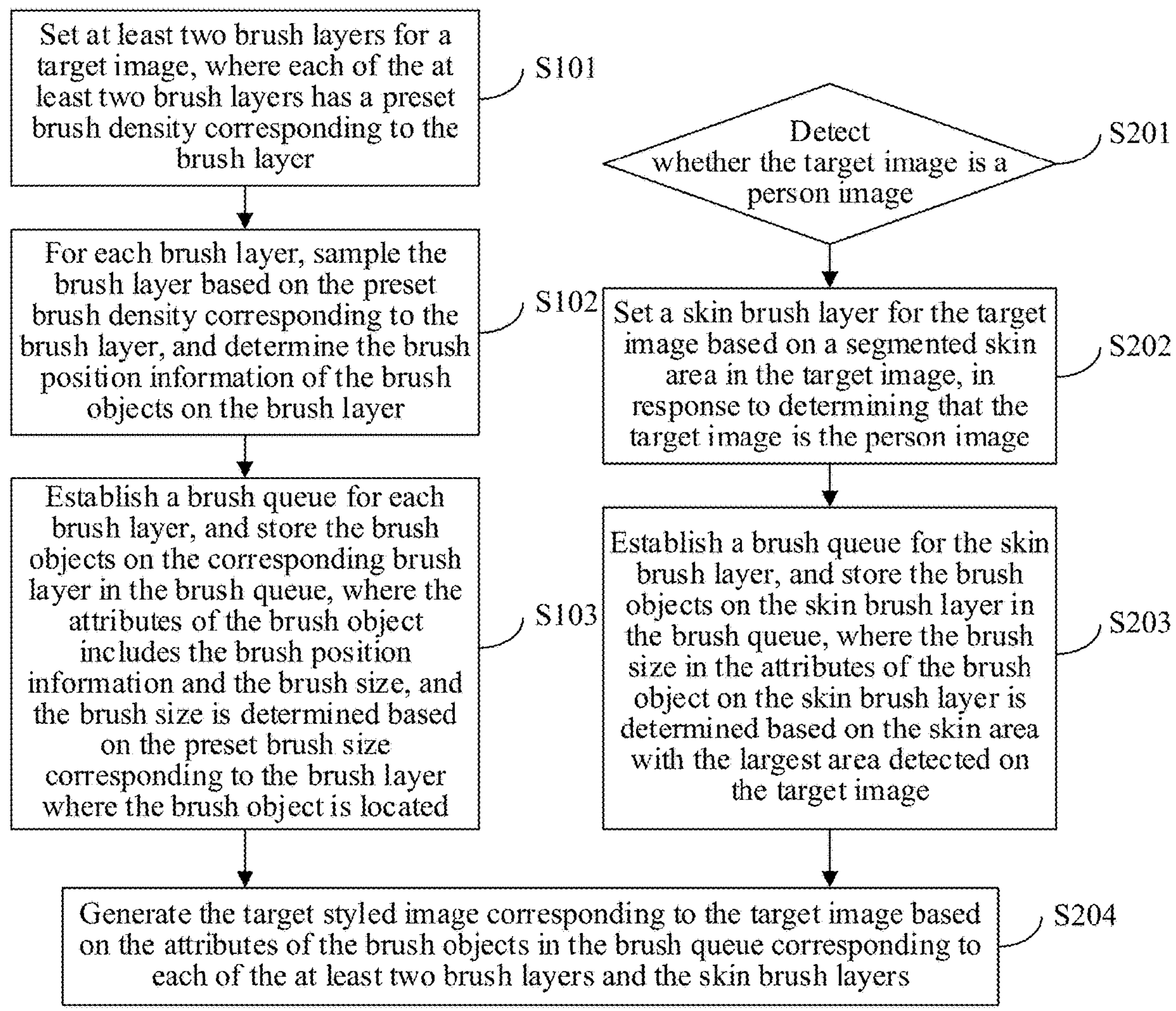
FIG. 2 is a flowchart of an image generation method according to another embodiment of the present disclosure.

FIG. 2 is a flowchart of an image generation method according to another embodiment of the present disclosure. On the basis of steps in the FIG. 1, the method may further include the following steps S201 to S204.

In S201, it is detected whether the target image includes a person image.

In an embodiment of the present disclosure, after the target image is determined, it may be detected whether the target image includes a person image.

In an embodiment, a face on the target image may be identified by means of face detection, and it is determined that the target image includes a person image if a face is detected.

In another embodiment, it may be determined whether the target image includes a person image by detecting other features of a person, such as detecting the legs. The specific detection method is not limited in the embodiment of the present disclosure.

In practice, the generation of a target styled image for a person image may be set as an optional image generation mode. When a user uploads a person image for generation of a target styled image, this image generation mode may be selected to trigger the image generation process for the person image.

In S202, a skin brush layer is set for the target image based on a segmented skin area in the target image, in response to determining that the target image is the person image.

In an embodiment of the present disclosure, if it is determined that the target image includes a person image, skin area detection is performed on the target image to determine skin area on the target image, and then the determined skin area is segmented from the target image based on a skin segmentation algorithm, and the skin brush layer is set for the target image based on the segmented skin area.

The drawing of the skin brush layer involves finer drawing of the skin area such as the face on the person image, so as to acquire better effect of the skin area in the final generated target styled image, and improve the user experience. Therefore, the drawing of the skin brush layer may only include the drawing of the skin area on the person image.

In S203, a brush queue is established for the skin brush layer, and the brush queue is stored with the brush objects on the skin brush layer. The brush size in the attributes of the brush object on the skin brush layer is determined based on the largest skin area detected on the target image.

In an embodiment of the present disclosure, after setting the skin brush layer for the target image, it is necessary to determine the attributes of the brush object on the skin brush layer. For the way of determining the attributes of each brush layer on the skin brush layer, reference may be made to the way of determining the attributes of the brush object on each brush layer in the foregoing embodiments.

In an embodiment, in order to make the brush size on the skin brush layer more suitable for drawing the skin area on the target image, the brush size of the brush object on the skin brush layer may be determined based on the size of skin areas on the target image.

In an embodiment, the brush size in the attributes of the brush object on the skin brush layer may be determined based on the skin area with the largest area detected on the target image. The larger the largest skin area is, the larger the brush size is, and the smaller the largest skin area is, the smaller the determined brush size is.

The processing of the face area among the skin areas is a factor affecting the image quality. Therefore, in an embodiment of the present disclosure, the brush size of the brush object on the skin brush layer may be determined based on the face area.

Specifically, the face area on the target image may be detected. If the target image includes multiple face areas, a largest face area among the multiple face areas is determined, and then the brush size of the brush object on the skin brush layer is determined based on the largest face area. The larger the largest face area is, the larger the determined brush size will be. On the contrary, the smaller the largest face area is, the smaller the determined brush size will be.

If there is only one face area on the target image, the brush size of the brush object on the skin brush layer is determined based on the size of the face area. Specifically, the brush size of the brush object on the skin brush layer is proportional to the size of the face area.

In S204, the target styled image corresponding to the target image is generated based on the attributes of the brush objects in the brush queue corresponding to each of the at least two brush layers and the skin brush layers.

In an embodiment of the present disclosure, after the brush objects are stored in the brush queues corresponding to respective brush layers set for the target image, the target styled image corresponding to the target image is generated based on the attributes of the brush objects in respective brush queues.

In an embodiment, first, based on the attributes of the brush objects in the brush queue corresponding to each of the at least two brush layers, the brush layers corresponding to the brush queues are drawn; then, the brush layers corresponding to the at least two brush queues are overlaid to obtain a first initial overlay layer. And, the skin brush layer is drawn based on the attributes of the brush objects in the brush queue of the skin brush layer; then, the first initial overlay layer is overlaid with the skin brush layer to generate the target styled image corresponding to the target image.

Taking the target styled image as an oil painting styled image as an example, FIG. 3 is an effect comparison diagram according to an embodiment of the present disclosure. Image A is the target image, and each of images B, C, and D is drawn with a single brush layer. Specifically, image B shows the effect of drawing the brush layer with only the large brush, image C shows the effect of drawing the brush layer with only the medium brush, and image D shows the effect of drawing the brush layer with only the small brush. Image F is obtained by overlaying the brush layers corresponding to B, C and D in FIG. 3, image E shows the effect of drawing the skin brush layer, and image G is obtained by overlaying the skin brush layer on image F. It can be seen that the image quality of image G with the skin brush layer overlaid is significantly higher than the image quality of image F.

In an embodiment of the present disclosure, for the way of drawing each of the at least two brush layers described above, reference may be made to the above embodiment, which will not be repeated here.

Before drawing the skin brush layer, it is first determined the attributes of the brush objects in the brush queue corresponding to the skin brush layer. Specifically, similar to the attributes of the brush objects in the brush queues corresponding to the at least two brush layers, the attributes of the brush objects in the brush queue corresponding to the skin brush layer may include the brush size, the brush position information, the drawing direction and the brush color. The brush size is determined based on the skin area with the largest area detected on the target image, which has been specifically introduced above in the step S203, and will not be repeated here.

For the determination of the brush position information, the skin brush layer may be uniformly sampled to determine the position of the center point of each brush object on the skin brush layer, and the position of each center point is determined as the brush position information of the corresponding brush object.

For the determination of the drawing direction, the drawing direction of each brush object on the skin brush layer may be determined in a random manner, thereby improving the efficiency of determining the drawing direction.

For the determination of the brush color, it may be determined, based on a color value of a pixel that has a correspondence with the brush position information of each brush object on the skin brush layer on the target image, the brush color of the corresponding brush object.

In an embodiment of the present disclosure, after determining the attributes of each brush object in the brush queue corresponding to the skin brush layer, each brush object is drawn based on the attributes of the corresponding brush object, thereby completing the drawing of the skin brush layer.

In an embodiment, the GPU may be used to draw the brush objects on the brush layers including the skin brush layer in parallel, thereby improving the efficiency in drawing the brush layers, and finally improving the efficiency in generating the target styled image.

The order of drawing the brush layers including the skin brush layer is not limited in this embodiment of the present disclosure. Specifically, after the at least two brush layers set for the target image are drawn, the at least two brush layers are overlaid to obtain the first initial overlay layer, and then the skin brush layer is overlaid with the first initial overlay layer, to finally obtain the target styled image corresponding to the target image.

In an embodiment, when overlaying the skin brush layer with the first initial overlay layer, for the skin areas, a pixel value of the pixel, which has a smallest brightness among pixels at a same position of the skin brush layer and the first initial overlay layer, may be determined as the pixel value of the pixel at the same position in the target styled image. Through the overlay, the quality of the skin areas in the generated target styled image can be improved, and the user's satisfaction with the generated target styled image can be further improved.

In the image generation method according to the embodiment of the present disclosure, in addition to the at least two brush layers, a skin brush layer is set for a person image. The skin brush layer is used to draw the skin areas in the person image separately, so as to improve the effect of the skin areas in the generated target styled image and further improve the quality of the target styled image.

In practice, during the process of drawing the target styled image, texture traces may be left on the canvas. In order to further improve the quality of the target styled image and reflect the drawing effect to the greatest extent in the generated target styled image, the embodiment of the present disclosure further provides an image generation method which adds a bump texture to the image, on the basis of the above embodiments.

Figure 4:
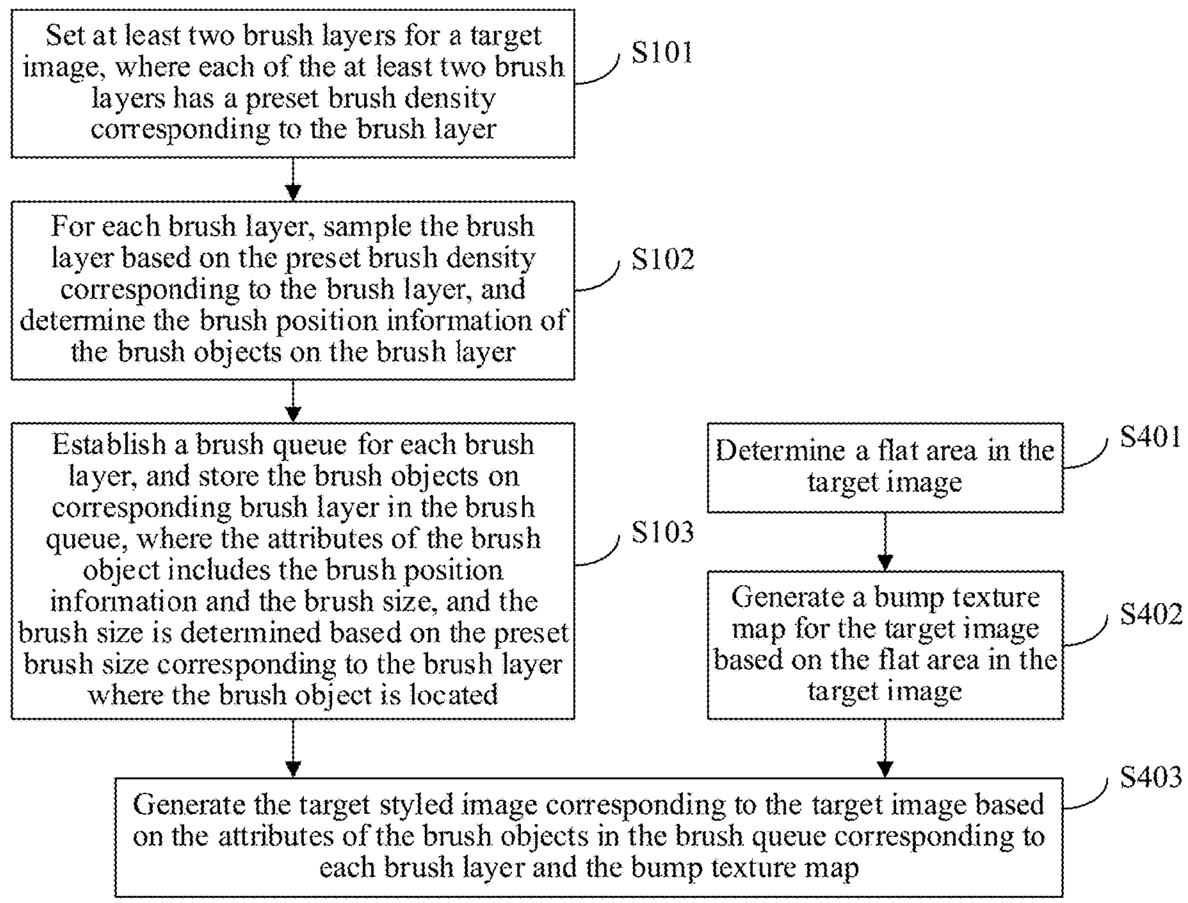
FIG. 4 is a flowchart of an image generation method according to another embodiment of the present disclosure.

FIG. 4 is a flowchart of an image generation method according to another embodiment of the present disclosure. Referring to FIG. 4, on the basis of steps in FIG. 1, the method further includes the following steps S401 to S403.

In S401, a flat area in the target image is determined.

In practice, adding a bump texture effect to the target styled image needs to be based on features of the target image itself. Therefore, in the embodiment of the present disclosure, the flat area in the target image is determined, then a bump texture map is generated for the target image based on the flat area of the target image, and then a bump texture effect is added to the target image based on the bump texture map.

In an embodiment, the flat area on the target image is determined. Specifically, the flat area on the target image may be determined by determining a texture intensity of each pixel on the target image.

In an embodiment, for each pixel in the target image, a structure tensor matrix corresponding to the pixel is calculated, and eigenvalue decomposition is performed on the structure tensor matrix to obtain two eigenvalues corresponding to the pixel. Then, a texture degree corresponding to the pixel is determined based on the larger one between the two eigenvalues corresponding to the pixel. Finally, the flat area in the target image is determined based on the texture degrees corresponding to respective pixels in the target image.

In practice, for each pixel on the target image, first the gradient information $g_x$ and $g_y$ of the pixel in the X-axis and Y-axis directions are calculated respectively, and then the structure tensor matrix $T_\sigma$ corresponding to the pixel is determined based on the gradient information according to formula (1). The formula (1) is as follows:

$$T_\sigma = \begin{bmatrix} g_x^2 * G_\sigma & g_x g_y * G_\sigma \\ g_y g_x * G_\sigma & g_y^2 * G_\sigma \end{bmatrix} \quad (1)$$

The operator "*" represents a convolution operation, and $G_\sigma$ represents a Gaussian kernel with a standard deviation of $\sigma$. This formula (1) is exemplary for the case of one pixel.

Secondly, eigenvalue decomposition is performed on the structure tensor matrix to obtain two eigenvalues s1 and s2 corresponding to the pixel, where s1>=s2. Then, the texture degree corresponding to the pixel is determined based on the larger eigenvalue s1 of the two eigenvalues corresponding to the pixel. The eigenvalue s1 may be used to represent the texture degree corresponding to the pixel. The larger the value of s1 is, the higher the texture degree corresponding to the pixel is, and the more uneven the corresponding position of the pixel is; while the smaller the value of s1 is, the lower the texture degree corresponding to the pixel is, and the more even the corresponding position of the pixel is.

In an embodiment of the present disclosure, the flat area in the target image may be determined based on the texture degrees corresponding to respective pixels on the target image. Taking a pixel as an example, for a pixel on the target image, the eigenvalue s1 that can represent the texture degree corresponding to the pixel is compared with a preset threshold t. If s1<t, it may be determined that the position corresponding to the pixel belongs to the flat area in the target image; on the contrary, if s1>=t, it may be determined that the position corresponding to the pixel does not belong to the flat area in the target image.

Moreover, in addition to the eigenvalue s1, another eigenvalue s2 may also be obtained by performing eigenvalue decomposition on the structure tensor matrix. In addition, the direction vectors v1 and v2 respectively corresponding to the eigenvalues s1 and s2 may also be obtained. The direction vector v2 corresponding to the eigenvalue s2 serves as the direction vector of the corresponding pixel. The direction vectors v2 respectively corresponding to the pixels on the target image constitute the direction field of the target image.

Based on the above method, determination of whether or not belonging to a flat area in the target image is performed for each pixel on the target image, and then pixels belonging to the flat area constitute the flat area on the target image.

In S402, a bump texture map is generated for the target image based on the flat area in the target image.

In an embodiment of the present disclosure, after the flat area in the target image is determined, a bump texture map of the target image is generated based on the flat area on the target image.

In an embodiment, taking an oil painting styled image as an example, in order to imitate the bump texture effect of drawing an oil painting on a canvas in real life, before generating the bump texture map corresponding to the target image, the brush layers corresponding to the brush queues are overlaid to obtain a second initial overlay layer. Then, the direction field of the second initial overlay layer is calculated, and the direction field is visualized through line integral to obtain an initial texture map corresponding to the second initial overlay layer. Finally, a streamline texture in an area corresponding to the flat area is smoothed in the initial texture map corresponding to the second initial overlay layer, to obtain the bump texture map corresponding to the target image. The bump texture map is used to add a bump texture effect to the target styled image.

For the method of calculating the direction field of the second initial overlay layer in the embodiment of the present disclosure, reference may be made to the above-mentioned method of determining the direction field of the target image. Specifically, the direction vectors v2 respectively corresponding to the pixels on the second initial overlay layer are calculated first, and then the direction vectors v2 respectively corresponding to the pixels on the second initial overlay layer constitute the direction field of the second initial overlay layer.

The line integral is a technology for vector field visualization, in which an initial texture map reflecting the streamlines is obtained by convolving white noise along a streamline direction by using a low-pass filter.

In S403, the target styled image corresponding to the target image is generated based on the attributes of the brush objects in the brush queue corresponding to each brush layer and the bump texture map.

In an embodiment, firstly, based on the attributes of the brush objects in the brush queue corresponding to each of the at least two brush layers, the brush layers corresponding to the brush queues are drawn; then, the brush layers corresponding to the at least two brush queues are overlaid to obtain a second initial overlay layer; finally, the bump texture map is overlaid with the second initial overlay layer, to generate the target styled image corresponding to the target image.

The s overlaying of the brush layers corresponding to the at least two brush queues may be understood with reference to the above embodiments, and details are not described herein again.

In an embodiment of the present disclosure, by overlaying the bump texture map to the second initial overlay layer, the bump texture effect is added to the target styled image, thereby improving the quality of the generated target styled image, and improving the user experience.

In an embodiment, taking an oil painting styled image as an example, with the bump map technology, the bump texture effect may be added to the oil painting styled image based on the bump texture map. The specific principle is that the bump texture map serves as the height information of the oil painting styled image, and the normal information is calculated by calculating the gradient of the bump texture, so as to generate a shadow effect and generate a bump texture for the oil painting styled image. As shown in FIG. 3, image H shows the effect of adding bump texture to image G in FIG. 3.

In addition, in order to further improve the quality of the generated target styled image, processing such as sharpening may be performed on the generated target styled image.

Before generating the target styled image, the resultant image by overlaying the bump texture map with the second initial overlay layer may be overlaid with the skin brush layer again, to improve the quality of the target styled image to the greatest extent.

In the image generation method according to the embodiment of the present disclosure, by adding a bump texture effect to the image, the generated target styled image is more like a real painting, and the quality of the generated target styled image is improved, thus improving the user's satisfaction with the target styled image.

Figure 5:
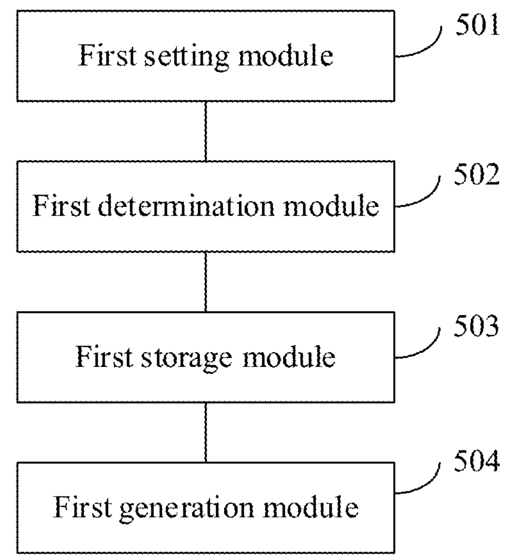
FIG. 5 is a structural block diagram of an image generation apparatus according to an embodiment of the present disclosure.

Corresponding to the above method embodiments, an image generation apparatus is also provided in the present disclosure. FIG. 5 is a schematic structural diagram of an image generation apparatus according to an embodiment of the present disclosure. Referring to FIG. 5, the apparatus includes a first setting module 501, a first determination module 502, a first storage module 503, and a first generation module 504.

The first setting module 501 is configured to set at least two brush layers for a target image, where each of the at least two brush layers is set with a preset brush density.

The first determination module 502 is configured to determine, for each brush layer, attributes of brush objects on the brush layer based on the preset brush density of the brush layer. The attributes include brush position information and brush size.

The first storage module 503 is configured to establish a brush queue for each brush layer, and for each of the brush objects, storing the brush object in the brush queue of the brush layer corresponding to the brush object.

The first generation module 504 is configured to generate a target styled image corresponding to the target image based on the attributes of the brush objects in the brush queue of each brush layer.

In an embodiment, the first determination module 502 is specifically configured to determine the preset brush size corresponding to the preset brush density based on the preset brush density of each brush layer and the correspondence between the preset brush density and the brush size.

In an embodiment, the first determination module 502 is specifically configured to determine the preset brush size corresponding to the preset brush density based on the preset brush density of each brush layer and the correspondence between the preset brush density and the brush size; and determine the brush size of the brush object based on the preset brush size.

In an embodiment, the attributes of the brush object further include a drawing direction, and the drawing direction is randomly generated.

In an embodiment, the attributes of the brush object further include a brush color, and the brush color is determined based on a color value of a pixel on the target image that has a correspondence with the brush position information of the brush object.

In an embodiment, the first generation module 504 includes: a first drawing sub-module and a first generation sub-module.

The first drawing sub-module is configured to draw, based on the attributes of the brush objects in the brush queue of each brush layer, the brush layer corresponding to the brush queue.

The first generation sub-module is configured to overlay brush layers corresponding to at least two brush queues to generate a target styled image corresponding to the target image.

In an embodiment, the first generation sub-module 504 includes a first determination sub-module.

The first determination sub-module is configured to determine a pixel value of a pixel, which has a smallest brightness among pixels at a same position of brush layers corresponding to at least two brush queues, as a pixel value of a pixel at the same position in the target styled image corresponding to the target image.

In an embodiment, the first drawing sub-module includes: a second drawing sub-module and a third drawing sub-module.

The second drawing sub-module is configured to draw, with a graphics operation unit, brush objects in respective brush queues in parallel based on the attributes of the brush objects in the brush queue of each brush layer.

The third drawing sub-module is configured to draw brush layers corresponding to respective brush queues based on the drawing of the brush objects in respective brush queues.

In an optional embodiment, the device further includes: a detection module and a second detection module.

The detection module is configured to detect whether the target image includes a person image.

The second setting module is configured to set a skin brush layer for the target image based on segmented skin areas in the target image, in response to the target image including a person image.

Correspondingly, the first generation module 504 is specifically configured to:

generate the target styled image corresponding to the target image, based on the attributes of the brush objects in the brush queue of each of the at least two brush layers and the skin brush layer.

In an embodiment, the device further includes:

a second storing module, configured to establish a brush queue for the skin brush layer, and store the brush object in the brush queue of the skin brush layer corresponding to the brush object. The brush size in the attributes of the brush object on the skin brush layer is determined based on a size of a largest skin area detected on the target image.

In an embodiment, the first generation module 504 includes: a fourth drawing sub-module, a first overlay sub-module, a fifth drawing sub-module, and a second overlay sub-module.

The fourth drawing sub-module is configured to draw, based on the attributes of the brush objects in the brush queues of the at least two brush layers, the brush layers corresponding to the brush queues.

The first overlay sub-module is configured to overlay brush layers corresponding to at least two brush queues to obtain a first initial overlay layer.

The fifth drawing sub-module is configured to draw, based on the attributes of the brush objects in the brush queue of the skin brush layer, the skin brush layer.

The second overlay sub-module is configured to overlay the first initial overlay layer with the skin brush layer to generate the target styled image corresponding to the target image.

In an embodiment, the apparatus further includes: a second determination module and a second generation module.

The second determination module is configured to determine a flat area in the target image.

The second generation module is configured to generate a bump texture map for the target image based on the flat area in the target image.

Correspondingly, the first generation module is specifically configured to:

generate the target styled image corresponding to the target image, based on the attributes of the brush objects in the brush queue of each brush layer and the bump texture map.

In an embodiment, the first generation module 504 includes: a sixth drawing sub-module, a third overlay sub-module, and a fourth overlay sub-module.

The sixth drawing sub-module is configured to draw, based on the attributes of the brush objects in the brush queues of the at least two brush layers, the brush layer corresponding to the brush queue.

The third overlay sub-module is configured to overlay brush layers corresponding to at least two brush queues to obtain a second initial overlay layer.

The fourth overlay sub-module is configured to overlay the bump texture map with the second initial overlay layer to generate the target styled image corresponding to the target image.

In an embodiment, the apparatus further includes:

a first calculation module, configured to calculate a direction field of the second initial overlay layer, and visualize the direction field through line integral to obtain an initial texture map corresponding to the second initial overlay layer.

Correspondingly, the second generation module is specifically configured to:

smooth, in the initial texture map corresponding to the second initial overlay layer, a streamline texture in an area corresponding to the flat area, to obtain the bump texture map corresponding to the target image.

In an embodiment, the second determination module includes: a calculation sub-module, and a second determination sub-module, and a third determination sub-module.

The calculation sub-module is configured to calculate, for each pixel in the target image, a structure tensor matrix corresponding to the pixel, and perform eigenvalue decomposition on the structure tensor matrix to obtain two eigenvalues corresponding to the pixel.

The second determination sub-module is configured to determine, for each pixel in the target image, a texture degree corresponding to the pixel based on the larger one between the two eigenvalues corresponding to the pixel.

The third determination sub-module is configured to determine the flat area in the target image based on the texture degrees corresponding to respective pixels in the target image.

With the image generation apparatus according to the embodiment of the present disclosure, the brush position information of the brush object is determined by sampling the brush layer based on the preset brush density, and the brush size of the brush object is determined based on the preset brush density corresponding to the brush layer. The brush position information of each brush object is determined in a simple and efficient manner, which improves the efficiency of determining the attributes of the brush objects involved in drawing the target styled image, and further improves the efficiency in generating the target styled image based on the attributes of the brush objects.

Moreover, in the present disclosure, a target styled image is finally generated by drawing at least two brush layers and then overlaying the brush layers, which can improve the quality of the generated target styled image.

It can be seen that, the image generation apparatus provided by the present disclosure can improve the quality of the target styled image in addition to improving the efficiency of generating the target styled image, thereby improving the user's satisfaction and experience.

In addition to the above method and apparatus, a computer-readable storage medium is also provided in embodiment of the present disclosure. The computer-readable storage medium stores instructions which, when being executed on a terminal device, cause the terminal device to implement the image generation methods according to the embodiments of the present disclosure.

Figure 6:
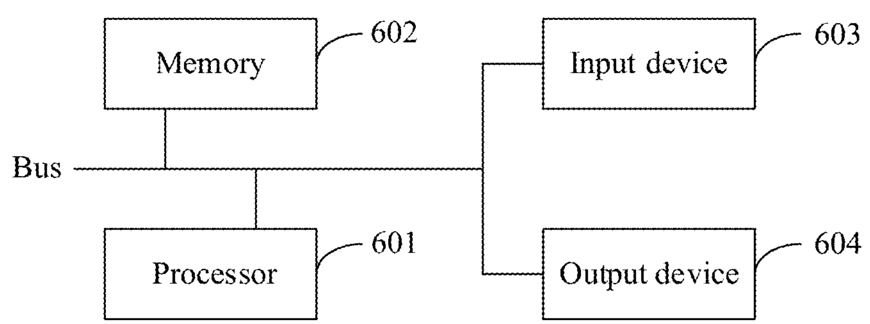
FIG. 6 is a structural block diagram of an image generation device according to an embodiment of the present disclosure.

In addition, an image generation device is also provided in an embodiment of the present disclosure. As shown in FIG. 6, the image generation device may include: a processor 601, a memory 602, an input device 603 and an output device 604.

The number of processors 601 in the image generation device may be one or more, and one processor is taken as an example in FIG. 6. In some embodiments of the present invention, the processor 601, the memory 602, the input device 603 and the output device 604 may be connected by a bus or in other ways. The connection by a bus is taken as an example in FIG. 6.

The memory 602 may be used to store software programs and modules, and the processor 601 executes various functional applications and data processing of the above image generation apparatus by running software programs and modules stored in the memory 602. The memory 602 may mainly include a program storage area and a data storage area. The program storage area may store an operating system, an application program required for at least one function, and the like. Additionally, the memory 602 may include a high-speed random access memory, and may also include a non-volatile memory, such as at least one magnetic disk storage device, flash memory device, or other volatile solid state storage device. The input device 603 may be used to receive input numerical or character information, and generate signal input related to user settings and function control of the image generation device.

Specifically in this embodiment, the processor 601 loads the executable files corresponding to the processes of one or more application programs into the memory 602 according to the following instructions, and the processor 601 executes the application programs stored in the memory 602, thus to realize various functions of the above image generation device.

It should be noted that, in this document, relational terms such as "first" and "second" etc. are only used to distinguish one entity or operation from another entity or operation, and do not necessarily require or imply there is such actual relationship or sequence between these entities or operations. Moreover, the terms "comprising", "comprises" or any other variation thereof are intended to encompass a non-exclusive inclusion such that a process, method, article or device that includes a list of elements includes not only those elements, but also includes other elements not explicitly listed, or elements inherent to such a process, method, article or apparatus. Without further limitation, an element defined by the phrase "comprising a . . . " does not preclude the presence of additional identical elements in a process, method, article or apparatus that includes the element.

The above descriptions are only specific embodiments of the present disclosure, so that those skilled in the art can understand or implement the present disclosure. Various modifications to these embodiments will be readily apparent to those skilled in the art, and the generic principles defined herein may be implemented in other embodiments without departing from the spirit or scope of the present disclosure. Therefore, the present disclosure is not intended to be limited to the embodiments described herein, but is to be accorded the widest scope consistent with the principles and novel features disclosed herein.

The invention claimed is:

1. An image generation method, comprising:

setting at least two brush layers for a target image, wherein each of the at least two brush layers is set with a preset brush density;

determining, for each brush layer, attributes of brush objects on the brush layer based on the preset brush density of the brush layer, wherein the attributes include brush position information and brush size;

establishing a brush queue for each brush layer, and for each of the brush objects, storing the brush object in the brush queue of the brush layer corresponding to the brush object; and generating a target styled image corresponding to the target image based on the attributes of the brush objects in the brush queue of each brush layer.

2. The method according to claim 1, wherein the determining, for each brush layer, attributes of brush objects on the brush layer based on the preset brush density of the brush layer comprises:

for each brush layer, sampling the brush layer based on the preset brush density of the brush layer, and determining the brush position information of the brush objects on the brush layer.

3. The method according to claim 1, wherein the determining, for each brush layer, attributes of brush objects on the brush layer based on the preset brush density of the brush layer comprises:

for each brush layer, determining a preset brush size corresponding to the preset brush density of the brush layer, based on the preset brush density and a correspondence between the preset brush density and the brush size; and determining the brush size of the brush object based on the preset brush size.

4. The method according to claim 1, wherein the attributes further comprise a drawing direction, and the drawing direction is randomly generated.

5. The method according to claim 1, wherein the attributes further comprise a brush color, and the brush color is determined based on a color value of a pixel on the target image that has a correspondence with the brush position information of the brush object.

6. The method according to claim 1, wherein the generating the target styled image corresponding to the target image based on the attributes of the brush objects in the brush queue of each brush layer comprises:

drawing, based on the attributes of the brush objects in the brush queue of each brush layer, the brush layer corresponding to the brush queue; and overlaying brush layers corresponding to at least two brush queues, to generate the target styled image corresponding to the target image.

7. The method according to claim 6, wherein the overlaying brush layers corresponding to at least two brush queues to generate the target styled image corresponding to the target image comprises:

determining a pixel value of a pixel, which has a smallest brightness among pixels at a same position of the brush layers corresponding to the at least two brush queues, as a pixel value of a pixel at the same position of the target styled image corresponding to the target image.

8. The method according to claim 6, wherein the drawing, based on the attributes of the brush objects in the brush queue of each brush layer, the brush layer corresponding to the brush queue comprises:

drawing, with a graphics operation unit, brush objects in respective brush queues in parallel based on the attributes of the brush objects in the brush queue of each brush layer; and drawing brush layers corresponding to respective brush queues based on the drawing of the brush objects in respective brush queues.

9. The method according to claim 1, wherein before generating the target styled image corresponding to the target image based on the attributes of the brush objects in the brush queue of each brush layer, the method further comprises:

detecting whether the target image includes a person image; and setting a skin brush layer for the target image based on segmented skin areas in the target image, in response to the target image including the person image;

the generating the target styled image corresponding to the target image based on the attributes of the brush objects in the brush queue of each brush layer comprises:

generating the target styled image corresponding to the target image based on the attributes of the brush objects in the brush queue of each of the at least two brush layers and the skin brush layer.

10. The method according to claim 9, wherein before generating the target styled image corresponding to the target image based on the attributes of the brush objects in the brush queue of each of the at least two brush layers and the skin brush layer, the method further comprises:

establishing a brush queue for the skin brush layer, and storing the brush object in the brush queue of the skin brush layer corresponding to the brush object, wherein the brush size in the attributes of the brush object on the skin brush layer is determined based on a size of a largest skin area detected on the target image.

11. The method according to claim 9, wherein the generating the target styled image corresponding to the target image based on the attributes of the brush objects in the brush queue of each of the at least two brush layers and the skin brush layer comprises:

drawing, based on the attributes of the brush objects in the brush queues of the at least two brush layers, the brush layers corresponding to the brush queues;

overlaying the brush layers corresponding to at least two brush queues to obtain a first initial overlay layer;

drawing the skin brush layer based on the attributes of the brush objects in the brush queue of the skin brush layer; and overlaying the first initial overlay layer with the skin brush layer to generate the target styled image corresponding to the target image.

12. The method according to claim 1, wherein before generating the target styled image corresponding to the target image based on the attributes of the brush objects in the brush queue of each brush layer, the method further comprises:

determining a flat area in the target image; and generating a bump texture map for the target image, based on the flat area in the target image;

the generating the target styled image corresponding to the target image based on the attributes of the brush objects in the brush queue of each brush layer comprises:

generating the target styled image corresponding to the target image, based on the attributes of the brush objects in the brush queue of each brush layer and the bump texture map.

13. The method according to claim 12, wherein the generating the target styled image corresponding to the target image, based on the attributes of the brush objects in the brush queue of each brush layer and the bump texture map comprises:

drawing, based on the attributes of the brush objects in the brush queues of the at least two brush layers, the brush layers corresponding to the brush queues;

overlaying brush layers corresponding to at least two brush queues to obtain a second initial overlay layer; and overlaying the bump texture map with the second initial overlay layer to generate the target styled image corresponding to the target image.

14. The method according to claim 13, wherein before overlaying the bump texture map with the second initial overlay layer to generate the target styled image corresponding to the target image, the method further comprises:

calculating a direction field of the second initial overlay layer, and visualizing the direction field through line integral, to obtain an initial texture map corresponding to the second initial overlay layer;

the generating the bump texture map for the target image based on the flat area in the target image comprises:

smoothing, in the initial texture map corresponding to the second initial overlay layer, a streamline texture in an area corresponding to the flat area, to obtain the bump texture map corresponding to the target image.

15. The method according to claim 12, the determining the flat area in the target image comprises:

for each pixel in the target image, calculating a structure tensor matrix corresponding to the pixel, and perform eigenvalue decomposition on the structure tensor matrix to obtain two eigenvalues corresponding to the pixel;

for each pixel in the target image, determining a texture degree corresponding to the pixel based on a larger one of the two eigenvalues corresponding to the pixel; and determining the flat area in the target image based on the texture degrees corresponding to respective pixels in the target image.

16. A non-transitory computer-readable storage medium having instruction stored thereon, wherein the instructions, when being executed on a terminal device, cause the terminal device to implement:

setting at least two brush layers for a target image, wherein each of the at least two brush layers is set with a preset brush density;

determining, for each brush layer, attributes of brush objects on the brush layer based on the preset brush density of the brush layer, wherein the attributes include brush position information and brush size;

establishing a brush queue for each brush layer, and for each of the brush objects, storing the brush object in the brush queue of the brush layer corresponding to the brush object; and generating a target styled image corresponding to the target image based on the attributes of the brush objects in the brush queue of each brush layer.

17. A device comprising:

a memory, a processor, and a computer program stored in the memory and executable on the processor, wherein the processor, when executing the computer program, is configured to implement:

setting at least two brush layers for a target image, wherein each of the at least two brush layers is set with a preset brush density;

determining, for each brush layer, attributes of brush objects on the brush layer based on the preset brush density of the brush layer, wherein the attributes include brush position information and brush size;

establishing a brush queue for each brush layer, and for each of the brush objects, storing the brush object in the brush queue of the brush layer corresponding to the brush object; and generating a target styled image corresponding to the target image based on the attributes of the brush objects in the brush queue of each brush layer.

18. The device according to claim 17, wherein the processor, when executing the computer program, is further configured to implement:

for each brush layer, sampling the brush layer based on the preset brush density of the brush layer, and determining the brush position information of the brush objects on the brush layer.

19. The device according to claim 17, wherein the processor, when executing the computer program, is further configured to implement;

for each brush layer, determining a preset brush size corresponding to the preset brush density of the brush layer, based on the preset brush density and a correspondence between the preset brush density and the brush size; and determining the brush size of the brush object based on the preset brush size.

* * * * *